(12) United States Patent
Deshpande et al.

(10) Patent No.: US 9,176,762 B2
(45) Date of Patent: Nov. 3, 2015

(54) HIERARCHICAL THRESHOLDS-BASED VIRTUAL MACHINE CONFIGURATION

(75) Inventors: Deepak Arun Deshpande, Pune (IN); Anindya Neogi, New Delhi (IN); Priti P. Patil, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 332 days.

(21) Appl. No.: 13/539,793

(22) Filed: Jul. 2, 2012

(65) Prior Publication Data

US 2014/0007093 A1    Jan. 2, 2014

(51) Int. Cl.
*G06F 9/455* (2006.01)
*G06F 9/50* (2006.01)

(52) U.S. Cl.
CPC .......... *G06F 9/45533* (2013.01); *G06F 9/5011* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,818,145 B2 | 10/2010 | Wood et al. | |
| 8,175,863 B1* | 5/2012 | Ostermeyer et al. | 703/22 |
| 8,621,057 B2* | 12/2013 | Kuroda et al. | 709/223 |
| 8,768,976 B2* | 7/2014 | McLachlan et al. | 707/805 |
| 2008/0222644 A1 | 9/2008 | Richards et al. | |
| 2008/0295096 A1 | 11/2008 | Beaty et al. | |
| 2009/0070771 A1 | 3/2009 | Yuyitung et al. | |
| 2009/0300173 A1* | 12/2009 | Bakman et al. | 709/224 |
| 2010/0191854 A1 | 7/2010 | Isci et al. | |
| 2010/0250642 A1 | 9/2010 | Yellin et al. | |
| 2011/0225277 A1 | 9/2011 | Freimuth et al. | |

OTHER PUBLICATIONS

Bobroff, et al., Dynamic Placement of Virtual Machines for Managing SLA Violations, Integrated Network Management, 2007. IM '07. 10th IFIP/IEEE International Symposium on, 119-128 , May 21, 2007—Yearly 25 2007.

* cited by examiner

*Primary Examiner* — Lewis A Bullock, Jr.
*Assistant Examiner* — Wynuel Aquino
(74) *Attorney, Agent, or Firm* — Garg Law Firm, PLLC; Rakesh Garg; Parashos T. Kalaitzis

(57) ABSTRACT

In response to a performance parameter of a virtual machine (VM) exceeding a threshold, an operation to be performed relative to the VM is identified. A resource requirement of performing the operation is determined using a resource requirement thresholds hierarchy. The resource requirement thresholds hierarchy is usable for computing the resource requirement of the operation when the operation is performed at a specified level in a hierarchy within a virtualized environment where the VM is executing. A violation value resulting from performing the operation is determined using a violation value thresholds hierarchy. If the resource requirement and the violation value do not exceed a resource requirement threshold and a violation value threshold respectively, a first configuration of the VM is revised to a second configuration of the VM. The second configuration includes a result of performing the operation relative to the VM at the specified level in the hierarchy.

18 Claims, 9 Drawing Sheets

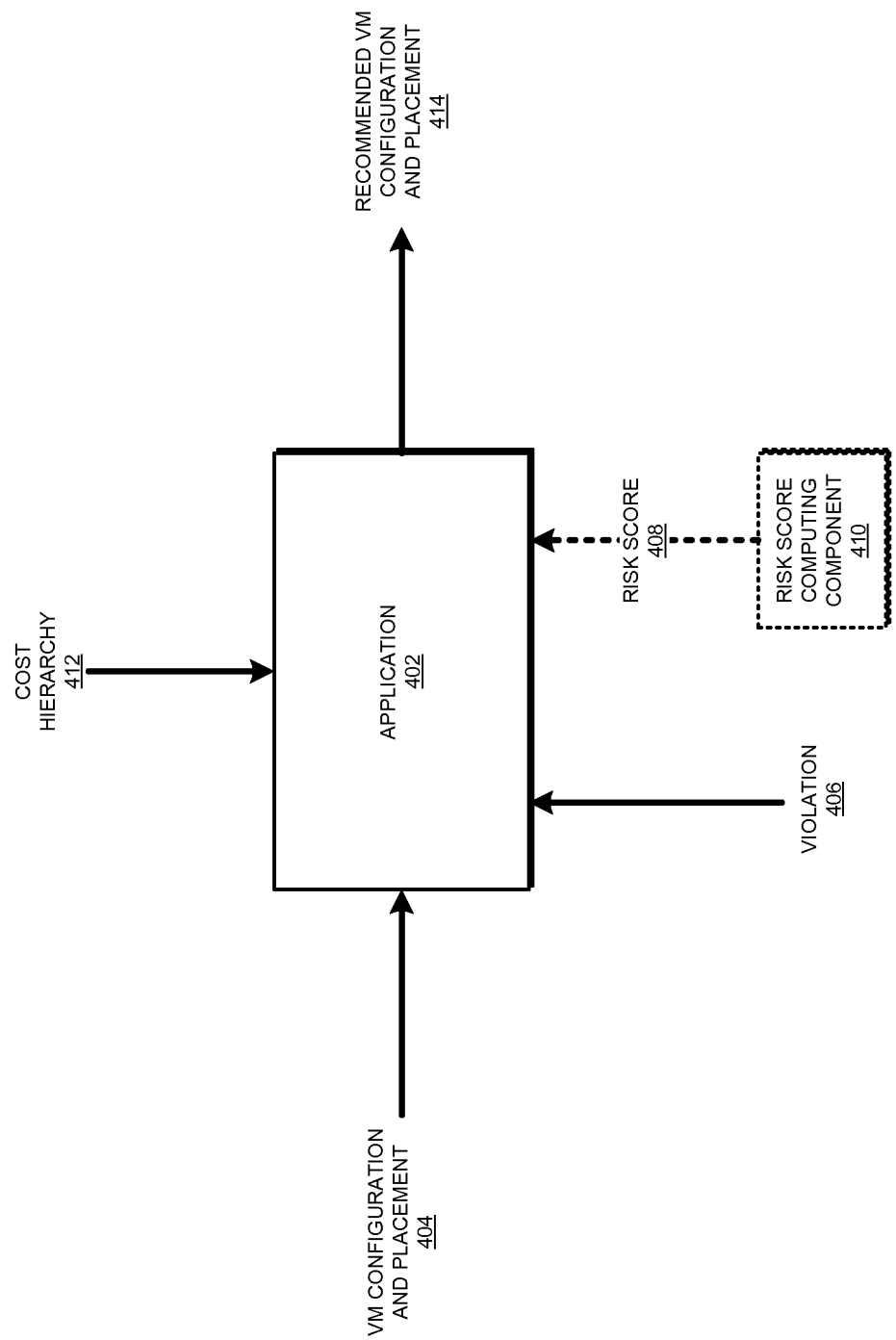

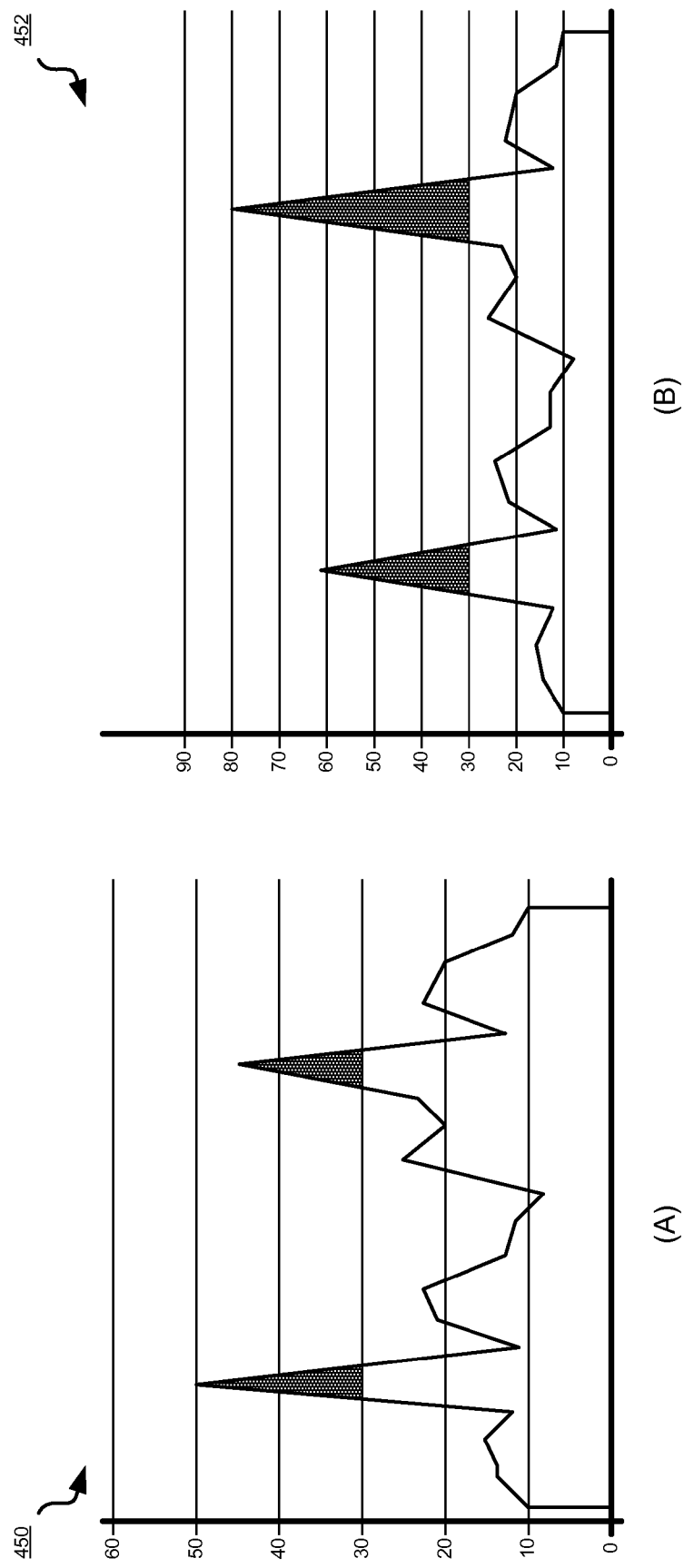

HIERARCHICAL THRESHOLDS-BASED VIRTUAL MACHINE CONFIGURATION

TECHNICAL FIELD

The present invention relates generally to a system, and computer program product for operating a data processing environment. Particularly, the present invention relates to a computer implemented method, system, and computer program product for hierarchical thresholds-based configuration and placement of virtual machines (VMs).

BACKGROUND

Description of the Related Art

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is called a "cloud" that provides computing resources and computing services to several clients on an as-needed basis.

SUMMARY

The illustrative embodiments provide a system, and computer program product for hierarchical thresholds-based virtual machine (VM) configuration. Responsive to a performance parameter of the VM exceeding a threshold, an operation to be performed relative to the VM is identified. A cost of performing the operation is determined using a resource requirement thresholds hierarchy. The resource requirement thresholds hierarchy is usable for computing the cost of the operation when the operation is performed at a specified level in a hierarchy within a virtualized data processing environment (environment) where the VM is executing, the hierarchy within the environment being a data center hierarchy that defines a logical virtualization infrastructure within a data center. A violation value resulting from performing the operation is determined using a violation value thresholds hierarchy. The violation value thresholds hierarchy is usable for computing the violation value resulting from the operation when the operation is performed at the specified level in the hierarchy within the environment where the VM is executing. Responsive to the cost not exceeding a cost threshold and the violation value not exceeding a violation value threshold, a first configuration of the VM is revised to a second configuration of the VM, wherein the second configuration includes a result of performing the operation relative to the VM at the specified level in the hierarchy.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A depicts a block diagram of an application configuration for hierarchical resource requirement thresholds-based VM configuration manipulation in accordance with an illustrative embodiment;

FIG. 4B depicts line graphs of example methods for computing violation values in accordance with an illustrative embodiment;

DETAILED DESCRIPTION

Figure 1:
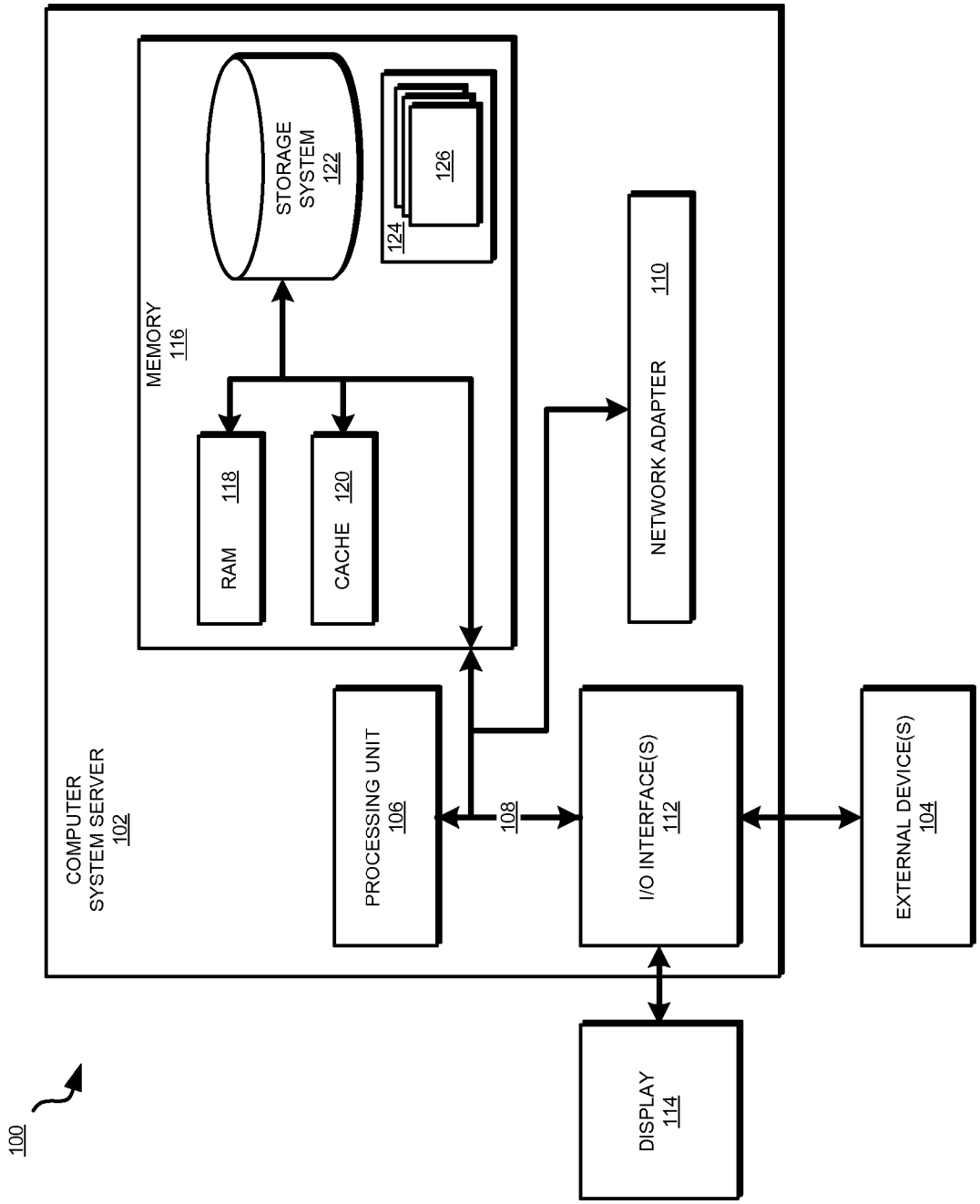
FIG. 1 depicts a cloud computing node in accordance with an illustrative embodiment.

One objective of a virtualized data processing environment is to maximize the utilization of computing resources while providing the clients their respective acceptable levels of service. The illustrative embodiments recognize that operating such a virtualized data processing environment requires careful planning and configuration of the computing resources.

For example, the illustrative embodiments recognize that configuring a VM with an amount of computing resources that is sufficient to execute a present workload at ninety percent utilization increases the utilization of the available resources but can also cause a violation of a customer's service level agreement (SLA) with a small change in the workload. Conversely, the illustrative embodiments also recognize that configuring a VM with excess resources, for example, for operating the VM at only twenty percent utilization not only reduces the chances of an SLA violation due to workload changes but is also wasteful of the computing resources, and therefore increases the resource requirement of processing the workload.

The illustrative embodiments recognize that configuring VMs in a data processing environment is a complex task that often has to balance opposing objectives. For example, the illustrative embodiments recognize that a VM can be configured in a variety of ways for avoiding a violation. Each possible configuration has associated therewith a different resource requirement of operating the VM or servicing a workload. Similarly, the illustrative embodiments recognize that a VM can also be reconfigured or relocated in a variety of ways to correct a detected violation. Again, each reconfiguration or relocation can potentially have a different resource requirement. The illustrative embodiments recognize that selecting a desirable configuration, a desirable placement, or a combination thereof is a non-trivial problem.

The illustrative embodiments used to describe the invention generally address and solve the above-described problems and other problems related to managing a data processing environment. The illustrative embodiments provide a system, and computer program product for hierarchical thresholds-based VM configuration.

Placement of a VM includes the process of selecting a data processing system on which to execute the VM. Selecting a host data processing system for a VM is an example of placing a VM. Selecting another VM that has to co-reside with a subject VM on a host is another example manner of placement of the subject VM.

With the scope of the illustrative embodiments, configuring a VM includes allocating additional computing resources (resources) to the VM, adjusting an amount of a resource allocated to the VM, changing a priority associated with a resource or a portion of the VM, manipulating a permission associated with a resource or a portion of the VM, or a combination thereof. Unless specified otherwise within the context of an embodiment, configuration of a VM is placement dependent. In other words, selecting a suitable placement for a VM is a part of configuring the VM.

Within the scope of the illustrative embodiments, a violation includes any operation of a VM that causes a parameter of the VM to exceed a threshold. For example, a processor utilization of a VM can be a parameter that causes a processing time for a transaction to exceed a threshold processing time by one microsecond. The processor utilization parameter exceeding a utilization threshold can cause a transaction processing time violation. As another example, a thread in a VM performing more input/output (I/O) operations than an I/O threshold can be another example violation. A process executing in a VM and causing more than a set number of page faults during a period is another example of a violation according to the illustrative embodiments.

According to the illustrative embodiments, a likelihood of a violation is a likelihood that a given configuration of a VM will cause a violation to occur. An illustrative embodiment can address a violation or a likelihood of a violation by manipulating a VM's configuration, performing an operation relative to the VM, or a combination thereof.

For example, an embodiment can mitigate a likelihood of a violation by allocating more resources to the VM, thereby manipulating a configuration of the VM. As another example, an embodiment can mitigate a likelihood of a violation by altering a placement of the VM, thereby manipulating a configuration of the VM and performing an operation on the VM. As another example, an embodiment can mitigate a likelihood of a violation by reducing a priority of another VM on the same host as the VM, thereby performing an operation relative to the VM.

The illustrative embodiments are described with respect to certain methods of computing violation values, manipulating configurations, and performing operations relative to VMs only as examples. Such descriptions are not intended to be limiting on the illustrative embodiments.

Similarly, the illustrative embodiments are described with respect to certain parameters, values, and data only as examples. Such descriptions are not intended to be limiting on the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Although this disclosure includes a detailed description on cloud computing, implementation of the teachings recited herein are not limited to a cloud computing environment. Rather, the illustrative embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Generally, a cloud computing environment exhibits the following characteristics—

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models available in a cloud computing environment are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and execute arbitrary software, which can include operating systems and applications. The consumer does not manage or control the underlying cloud infrastructure but has control over operating systems, storage, deployed applications, and possibly limited control of select networking components (e.g., host firewalls).

Deployment Models available for cloud computing environments are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). The community cloud may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 106, a system memory 116, and a bus 108 that couples various system components including system memory 116 to processor 106.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 116 can include computer system readable media in the form of volatile memory, such as random access memory (RAM) 118 and/or cache memory 120. Computer system/server 102 may further include other removable/non-removable, volatile/non-volatile computer system storage media. By way of example only, storage system 122 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 116 may include at least one program product having a set (e.g., at least one) of program modules that are configured to carry out the functions of embodiments of the invention.

Program/utility 124, having a set (at least one) of program modules 126, may be stored in memory 116 by way of example, and not limitation, as well as an operating system, one or more application programs, other program modules, and program data. Each of the operating system, one or more application programs, other program modules, and program data or some combination thereof, may include an implementation of a networking environment. Program modules 126 generally carry out the functions and/or methodologies of embodiments of the invention as described herein.

Computer system/server 102 may also communicate with one or more external devices 104 such as a keyboard, a pointing device, a display 114, etc.; one or more devices that enable a user to interact with computer system/server 102; and/or any devices (e.g., network card, modem, etc.) that enable computer system/server 102 to communicate with one or more other computing devices. Such communication can occur via I/O interfaces 112. Still yet, computer system/server 102 can communicate with one or more networks such as a local area network (LAN), a general wide area network (WAN), and/or a public network (e.g., the Internet) via network adapter 110. As depicted, network adapter 110 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2A:
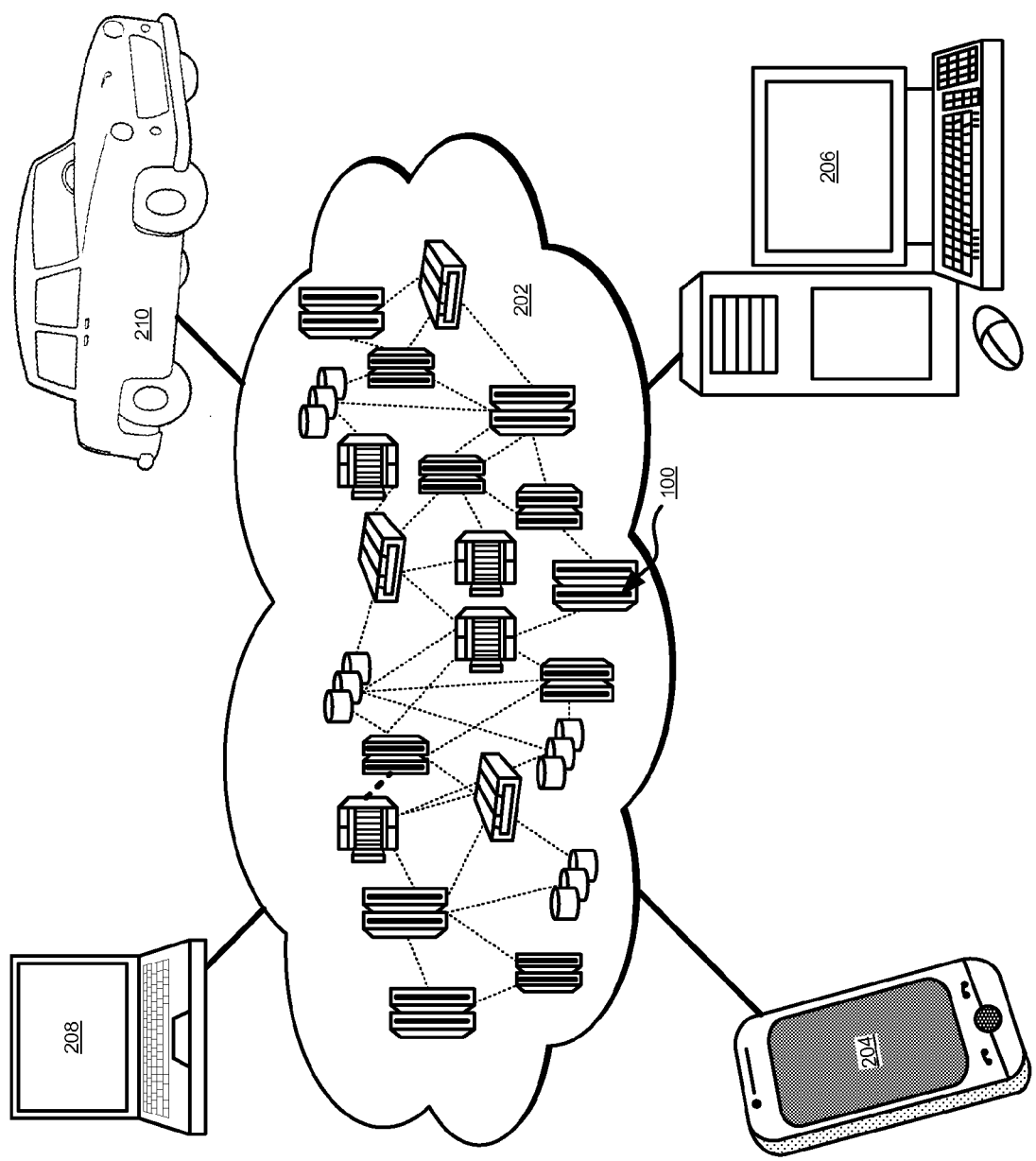
FIG. 2A depicts a cloud computing environment in accordance with an illustrative embodiment.

Referring now to FIG. 2A, illustrative cloud computing environment 202 is depicted. As shown, cloud computing environment 202 comprises one or more cloud computing nodes 100 with which local computing devices used by cloud consumers, such as, for example, personal digital assistant (PDA) or cellular telephone 204, desktop computer 206, laptop computer 208, and/or automobile computer system 210 may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 202 to offer infrastructure, platforms and/or software as services for which a cloud consumer does not need to maintain resources on a local computing device. It is understood that the types of computing devices 204, 206, 208, and 210 shown in FIG. 2A are intended to be illustrative only and that computing nodes 100 and cloud computing environment 202 can communicate with any type of computerized device over any type of network and/or network addressable connection (e.g., using a web browser).

Figure 2B:
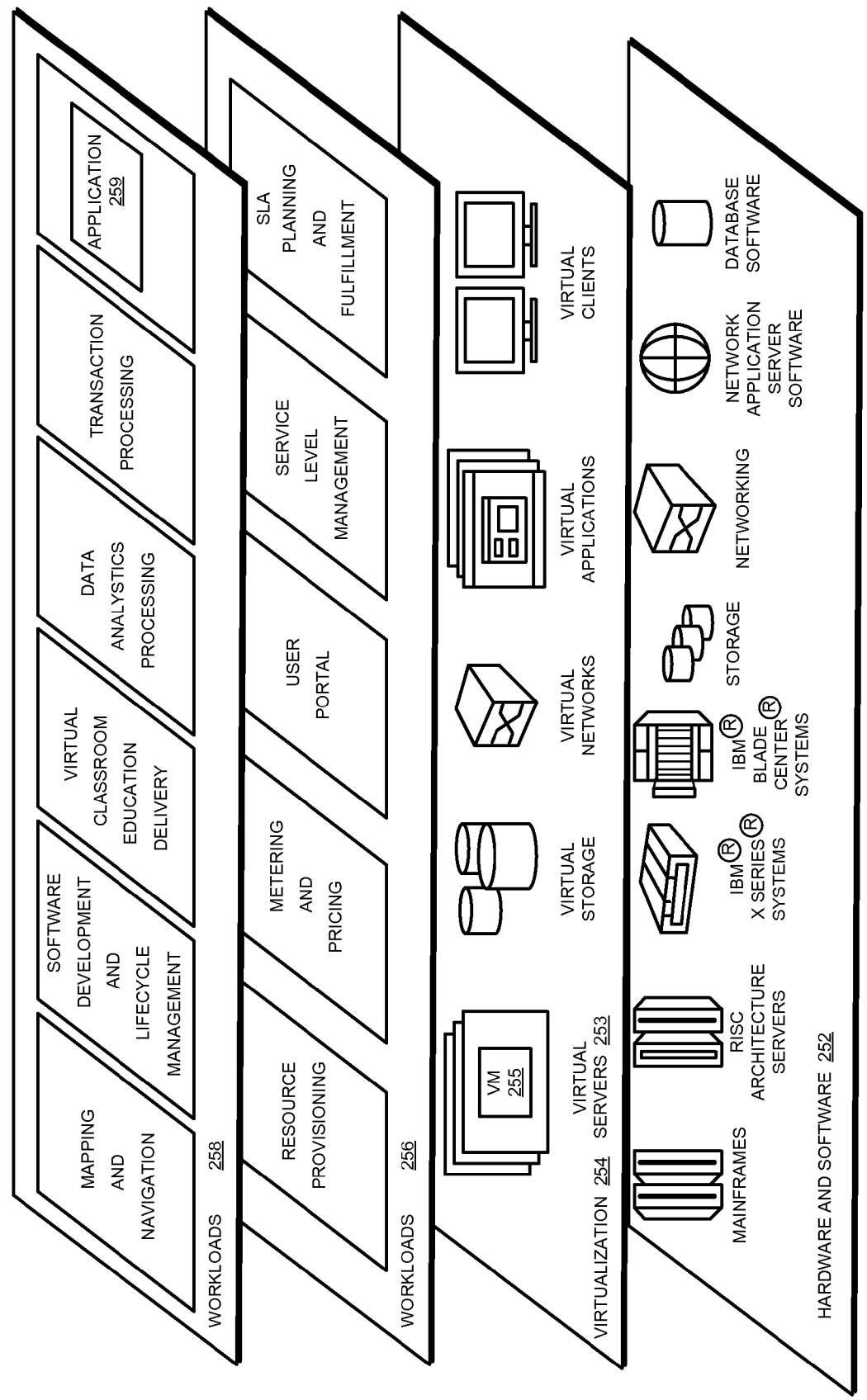
FIG. 2B depicts abstraction model layers in a cloud computing environment in accordance with an illustrative embodiment.

Referring now to FIG. 2B, a set of functional abstraction layers provided by cloud computing environment 202 (FIG. 2A) is shown. It should be understood in advance that the components, layers, and functions shown in FIG. 2B are intended to be illustrative only and embodiments of the invention are not limited thereto. As depicted, the following layers and corresponding functions are provided:

Hardware and software layer 252 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 254 provides an abstraction layer from which the following examples of virtual entities may be provided: virtual servers; virtual storage; virtual networks, including virtual private networks; virtual applications and operating systems; and virtual clients.

In one example, management layer 256 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 258 provides examples of functionality for which the cloud computing environment may be utilized. Examples of workloads and functions which may be provided from this layer include: mapping and navigation; software development and lifecycle management; virtual classroom education delivery; data analytics processing; transaction processing; and application 259.

VM 255 is an example VM in virtual server 253 in virtualization layer 254. An embodiment manipulates the configuration of VM 255 as described herein. Application 259 in workloads layer 258 is an example application implementing an embodiment.

The hardware in FIGS. 1, 2A, and 2B may vary depending on the implementation. Other internal hardware or peripheral devices, such as flash memory, equivalent non-volatile memory, or optical disk drives and the other computer usable storage devices, may be used in addition to or in place of certain hardware depicted in FIGS. 1, 2A, and 2B. In addition, the processes of the illustrative embodiments may be applied to a multiprocessor data processing system.

Figure 3:
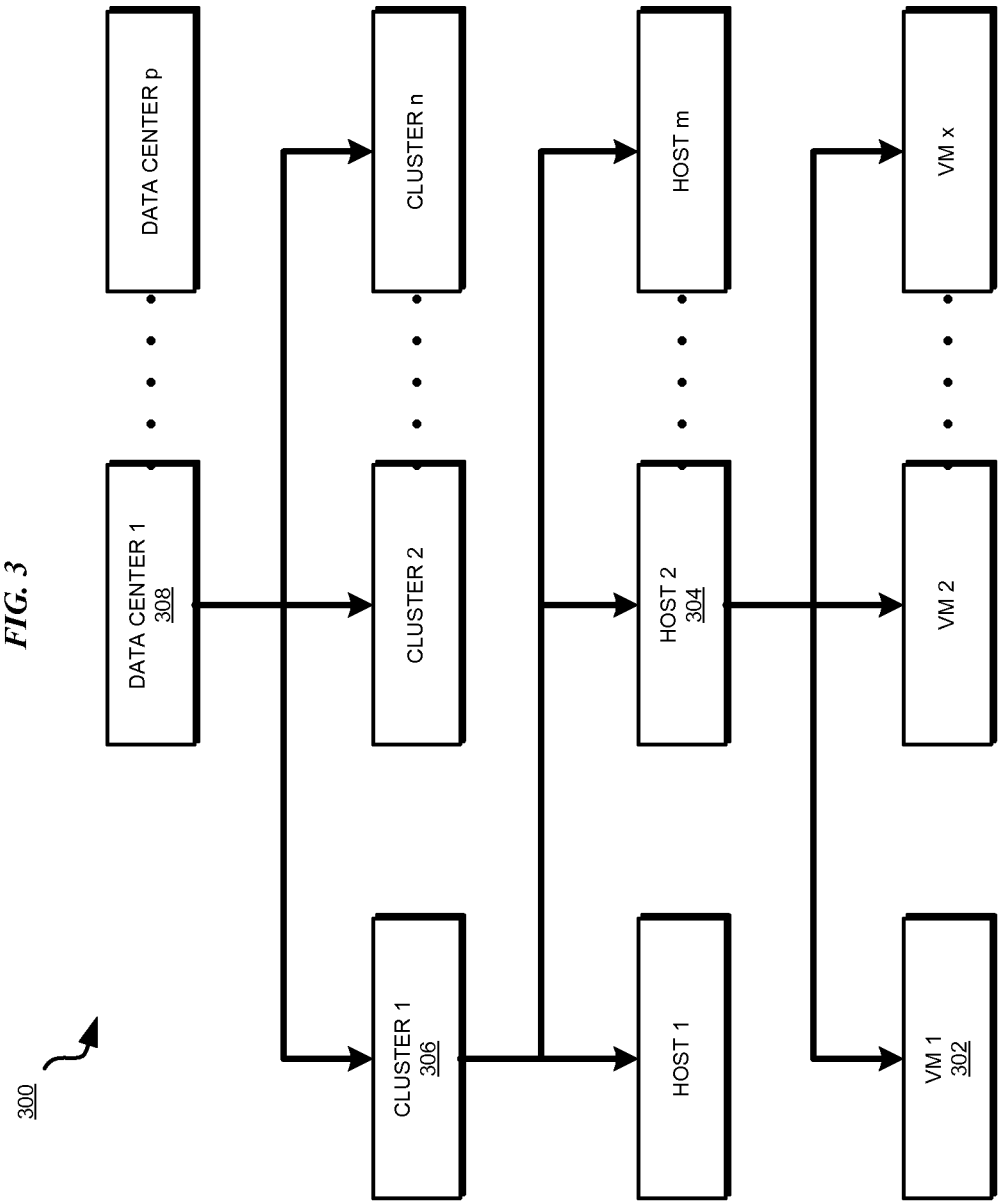
FIG. 3 depicts a block diagram of an example hierarchy in a data processing environment using which configuration thresholds for various VM configurations, and the violation values associated there with, can be computed in accordance with an illustrative embodiment.

With reference to FIG. 3, this figure depicts a block diagram of an example hierarchy in a data processing environment using which configuration resource requirement thresholds for various VM configurations, and the violation values associated therewith, can be computed in accordance with an illustrative embodiment. All or part of hierarchy 300 can be configured as a virtualized data processing environment to serve as a cloud. VM 302 is analogous to VM 235 in FIG. 2B.

Hierarchy 300 is a simplified depiction of a virtualized data processing environment in which several VMs are distributed across several host data processing systems. The host data processing systems are arranged in one or more clusters, and several clusters comprise a data center. Those of ordinary skill in the art will be able to expand or otherwise adapt hierarchy 300 to map to a particular data processing environment.

VM 302 labeled "VM 1" is one of x number of VMs configured to execute on host 304. Host 304 labeled "Host 2" is one of m number of hosts available in hierarchy 300. Host 304 participates in cluster 306 labeled "cluster 1". Clusters 1 through n are configured in data center 308, labeled "data center 1". Data center 308 is one of p number of data centers that are organized in a similar manner.

Assume that an embodiment has to change the configuration of VM 302, such as to avoid a likelihood of violation by the present configuration of VM 302, or to rectify a violation in VM 302. According to an embodiment, the configuration of VM 302 can be modified in several different ways, each way of modifying the configuration having a different resource requirement.

As described earlier, a likelihood of a violation, or risk, is a likelihood that a given configuration of a VM will cause a violation to occur. A violation value, or a risk score, is a numerical measure of a probability of a violation, such as a violation from capacity overuse or under-use in the virtual environment. Furthermore, the violation value can be computed by analyzing the resource utilization data, including historical utilization data, current utilization data, or forecasted utilization data.

The illustrative embodiments recognize that designing an optimization plan for a virtualized data processing environment to minimize the violation values is a challenging task in capacity planning. For example, the resource requirement of a likelihood of violation increases significantly from the virtual machine level of hierarchy 300 that includes VM 302, to the host machine level of hierarchy 300 that includes host 304, to the cluster level of hierarchy 300 that includes cluster 306, to the cloud or data center level of hierarchy 300 that includes data center 308. Accordingly, designing an optimization plan to minimize the likelihood of violation at each level is also a challenging task in capacity planning.

An embodiment can calculate the violation value for each level of hierarchy 300. The embodiment can relate the violation values at various levels with each other using a suitable mathematical function. Of course, violation values and their relationships are dependent on the particular implementation of hierarchy 300. Generally, violation values are related to each other in hierarchical manner cascading from the virtual machine level, to the host level, to the cluster level, to the data center level, and any other levels prevailing in a given implementation, via a mathematical function. For example, in one embodiment, the violation value of a host is the sum of violation values of all VMs placed on that host, the violation value of a cluster is the sum of the violation values of all the hosts in that cluster, and the violation value of a data center is the sum of the violation values of all clusters in the data center. Any change in the violation value of a VM results in a change in the violation values of the corresponding host, cluster, and data center.

An embodiment also recognizes that the options of placing a VM on a different host, a different cluster, or a different data center can each have a different associated likelihood of violation and resource requirement. By hierarchically organizing the violation values and resource requirement thresholds from the VM level to the data center level of hierarchy 300, an optimization plan can minimize the likelihood of violation and the associated resource requirement when considering moving a VM in the virtualized data processing environment.

For example, suppose that the resource utilization of VM 302 increases suddenly while operating in the depicted location in hierarchy 300. As the illustrative embodiments have recognized, the resource requirement thresholds for addressing that increased utilization progressively increases when considering a solution in the VM level, in the host level, in the cluster level, and in the data center level of hierarchy 300.

For example, an embodiment can modify the configuration of VM 302 such that additional or different resources are allocated to VM 302, with VM 302 continuing to execute in host 304. In such a reconfiguration process, the resource requirement of reconfiguration includes at least the additional or different resources, such as processor, memory, data storage capacity, network traffic capacity, and licenses. The resource requirement of this reconfiguration process can further include the resource equivalent of deteriorated performance of another VM executing on host 304, such as the VM labeled "VM 2", the resource equivalent of depleted resource reserves in host 304, the time expended in reconfiguring VM 302, any downtime required to reconfigure VM 302, resource equivalent of the effects of migrating another VM away from host 304, such as moving "VM x" from host 304 to "host m".

Another example of a resource requirement associated with reconfiguring VM 302 on host 304 includes a cost of violating a policy or the resource requirements for adjusting a policy. For example, a policy may require that two specified workloads should not execute on the same host. Keeping VM 302 on host 304 may cause such a policy to be violated, such as when "VM 2" is expected to execute a conflicting workload. A cost of avoiding violating such a policy may be a resource requirement of relocating "VM 2" to "Host m". Another resource requirement of avoiding violating such a policy may be an increase in the licensing costs. For example, two VMs may be executing on host 304 to share a license. Moving one of the VMs to another host may cause the VMs to use two separate licenses, thereby increasing the cost of licensing.

As another example, an embodiment can modify the configuration of VM 302 such that the placement of VM 302 is changed from host 304 to "host 1". An embodiment can change the placement with or without additional or different resources being allocated to VM 302. In such a reconfiguration process, the resource requirement of reconfiguration includes at least the resource requirement of migrating VM 302 to "host 1", and the additional or different resources, if any.

The resource requirement of this reconfiguration process can further include the resource equivalent of deteriorated performance of another VM executing on "host 1", the amount of depleted resource reserves in "host 1", the time expended in reconfiguring VM 302, the downtime required to reconfigure VM 302, migration cost such as resource requirements or differences for migrating VM 302 to "host 1", and resource requirement of migrating another VM away from "host 1" to accommodate VM 302 thereon.

Some other examples of migration costs include resource requirement of increased data traffic on the network during the migration; resource requirement of increased data traffic due to changes in application affinities from the migration; utilization of processor, memory, and other resources for the migration; downtime for hosts, clusters, cluster groups, routes, and other resources for performing the migration; and resource requirement of re-optimizing hosts, clusters, cluster groups, routes, and other resources upon performing the migration. Migration of a VM also incurs administration costs for manual and automated tasks associated with migration. For example, migrating a VM may require approvals, changes to workflows, notifications, conflicts resolutions, or reconfigurations, all of which require some resources and therefore add cost to the migration.

Additional costs from migration can include increased failover resources or redundant resources that may be required to accommodate the additional migrated VM. Additional infrastructure consumption is another cost factor in migration of a VM. For example, in a particular implementation, the failover/high-availability configuration may include high-end servers, hypervisor, or a combination of these and other resources. Cost of migrating the VM to a high-end server where 99.9 percent up-time is guaranteed may be significantly more than a low-end server where 99 percent up-time was guaranteed for the VM before the migration.

Similarly, a configuration of a VM can be changed, a placement of a VM can be changed, or both, at different levels of hierarchy 300 to avoid a likelihood of violation or to address a violation that has already occurred. VM 302 can be reconfigured while remaining at host 304; VM 302 can be reconfigured, migrated to another host, or both; VM 302 can be reconfigured, migrated to another cluster, or both; or VM 302 can be reconfigured, migrated to another data center, or both. In other words, a change in VM 302 can include a change that occurs at different levels of hierarchy 300, to wit, VM level, host level, cluster level, or data center level according to simplified hierarchy 300. In addition, these changes to VM 302 can trigger similar changes to other VMs at different levels of the hierarchy.

Depending on the level of hierarchy 300 at which a change occurs in response to a change in the configuration of VM 302, placement of 302, configuration of another VM, and placement of another VM, the resource requirement of avoiding the likelihood of violation or addressing an existing violation can be different. Generally, the resource requirement increases as changes are made from leaf nodes—the VMs, to nodes higher up in hierarchy 300 towards the root of hierarchy 300.

As an example, consider that a response time of an application executing on VM 1 has increased by 10 micro seconds, requiring some change in the VM 1's configuration. As a first option, if the resource usage of VM 1 is analyzed and increased in-place, such as by allocating addition CPU or memory to VM 1, the resource requirement, or cost, incurred is "cost 1". As a second option, if additional application licenses are obtained and VMs and 3 are configured to operate in parallel with VM 1, the increase in cost is due to increase in the CPU and memory usage (Cost 1) plus increase in the cost of licenses (cost 2). As a third option, if VM 1 is migrated to another under-utilized host in the same cluster, the cost includes cost of migration (cost 3), and cost of resources at the new host (cost 4). The migration cost may also include some part of costs 1 and 2 pre-migration or during migration, such as when uninterrupted service is required (cost 1, 2, 3, and 4). Migrating VM 1 to another cluster additionally incurs a cost of additional administration and policy changes (cost 5), for a likely total cost of costs 1+2+3+4+5 under certain circumstances. Migrating VM 1 to a different data center can incur, among other costs, a cost of shut-down, and restart, and downtime of certain data center level resources, such as routers (cost 6). Under certain circumstances, the total cost of migrating to a different data center can be costs 1+2+3+4+5+6 or some factor thereof.

Similarly, consider another example where the availability requirement of a VM has changed from 99% availability to 99.9% availability. Migrating the VM to a high-end server where 99.9% availability can be guaranteed has a different resource requirement than running parallel replicas of VM on two low-end hosts each of which individually offering 99% availability and collectively offering 99.9% availability. Configuring two mid or low-end servers with hypervisor level failover support translates to a yet different resource requirement. Configuring the two mid or low-end servers with hardware failover support is a still different resource requirement. As another option, which incurs a different higher resource requirement, the VM can be maintained on low-end servers as multiple copies in different clusters. Such a solution requires additional VMs, synchronization, and migration costs but may save infrastructure support costs and license utilization costs.

An embodiment collects fixed or static resource requirements for making configuration and placement changes at various levels of hierarchy 300. The embodiment creates formulae for computing certain other variable resource requirements associated with making configuration and placement changes, such as resource requirements that change with time or type of change, at various levels of hierarchy 300. The embodiment thus creates a resource requirement thresholds hierarchy having threshold levels, and corresponding to the levels in hierarchy 300.

The resource requirement thresholds hierarchy is helpful in a decision making process, such as one implemented in application 259 in FIG. 2B, to determine a preferred manner of making configuration and placement changes for managing violations. The resource requirement considerations of reconfiguring VM 302 might place VM 302 anywhere in hierarchy 300. The likelihood of violation in VM 302's new configuration, however, is also an optimization factor in determining a suitable placement of VM 302.

For example, corresponding to hierarchy 300, a violation value thresholds hierarchy defines a likelihood of a violation in a VM at each level in hierarchy 300. Assume that $R_{dc}$, $R_{cl}$, $R_h$, and $R_{vm}$ are violation values of the possible reconfigurations of VM 302 at the data center, cluster, host, and VM levels of hierarchy 300. Costs $C_{dc}$, $C_{cl}$, $C_h$, and $C_{vm}$, are costs, or resource requirements, in those reconfigurations of VM 302 at the data center, cluster, host, and VM levels of hierarchy 300. If VM 302 is reconfigured across data centers in the data center level, an optimization model according to an embodiment ensures that $R_{dc}$ is less than a threshold for $R_{dc}$, and $C_{dc}$ is less than a threshold for $C_{dc}$ in VM 302's new configuration.

Likewise, if VM 302 is reconfigured across clusters in the cluster level, an optimization model according to an embodiment ensures that $R_{cl}$ is less than a threshold for $R_{cl}$, and $C_{cl}$ is less than a threshold for $C_{cl}$ in VM 302's new configuration. Similarly, if VM 302 is reconfigured across hosts in the hosts level, an optimization model according to an embodiment ensures that $R_h$ is less than a threshold for $R_h$, and $C_h$ is less than a threshold for $C_h$ in VM 302's new configuration. If VM 302 is reconfigured in the VM level, an optimization model according to an embodiment ensures that $R_{vm}$ is less than a threshold for $R_{vm}$, and $C_{vm}$ is less than a threshold for $C_{vm}$ in VM 302's new configuration.

Depending on which reconfiguration yields comparatively better violation value and resource requirement for VM 302 and other affected VMs, the optimization model of an embodiment selects a suitable reconfiguration alternative for VM 302. In an example circumstance, a violation may be a violation of a term of an SLA. Given a violation value thresholds hierarchy and a resource requirement thresholds hierarchy, even the lowest resource requirement of addressing the violation or the likelihood of the violation may exceed the cost incurred by the violation. In such a case, an embodiment attempts to reduce the violation value of VM 302 in one or more levels, resource requirement of reconfiguration in one or more levels, or both, such that a combination of the revised violation value and the revised resource requirement of reconfiguration for reconfiguration in some level of hierarchy 300 is acceptable according to the SLA. An optimization plan according to an embodiment then selects the reconfiguration option where the violation value and the resource requirement of reconfiguration are acceptable.

In another example circumstance, the violation may be a violation of a policy in a set of policies $\{P_0, P_1, \ldots, P_k\}$. Each policy in the set has a corresponding weight in a set of weights $\{W_0, w_1, \ldots, W_k\}$. A likelihood of violating a policy $P_k$ is denoted by $r_k$ which is dependent on $W_k$ for policy $P_k$. Likelihood of violating a policy by a given configuration of VM 302 is $\Sigma r_k$ for the set of policies. $\Sigma r_k$ yields a positive value for certain weight-policy pairs, and a negative value for certain weight-policy pairs. The actual violation value of VM 302 is therefore the positive number minus the negative number. An embodiment uses this final violation value to assess whether reconfiguration of VM 302 is warranted.

With reference to FIG. 4A, this figure depicts a block diagram of an application configuration for hierarchical resource requirement thresholds-based VM configuration manipulation in accordance with an illustrative embodiment. Application 402 can be implemented as application 259 in FIG. 2B.

Application 402 receives configuration and placement information 404 about one or more VMs operating in a virtualized data processing environment. In one example embodiment, information 404 pertains to VM 302 in FIG. 3. In another embodiment, information 404 pertains to VM 302 and "VM 1" in FIG. 3. In another embodiment, information 404 pertains to VM 302 and another VM executing on a host in "cluster n" (not shown). In another embodiment, information 404 pertains to all or a subset of VMs operating in hierarchy 300 in FIG. 3. In one embodiment, application 402 also receives hierarchy 300 in FIG. 3 as an input (not shown).

Application 402 further receives information about violation 406 as another input. Violation 406, when present can be a violation in one of the VMs whose information is provided in information 404. Note that in one embodiment, application 402 receives information about violation 406 when an actual violation exists in a given hierarchy.

Application 402, alternatively or in conjunction with violation 406, receives violation value 408 about a VM whose configuration information is provided in information 404. For example, in one embodiment, violation value 408 for a VM is available to application 402 when the VM has not yet caused a violation, so that application 402 can determine whether the VM can be better configured so as to reduce the violation value. As another example, in another embodiment, violation value 408 is available to application 402 when information about violation 406 is also available for that VM, so that application 402 can determine whether the factors contributing to violation value 408 and violation 406 are same or different. In other words, using violation 406 and violation value 408 together, application 402 can determine whether the VM in question has a propensity for certain types of violations that are predictable by one or more benchmark workloads.

Violation value computing component 410 provides violation value 408 of a VM to application 402. In one embodiment, component 410 is included in application 402, and application 402 computes violation value 408 instead of receiving as an input.

Application 402 further receives resource requirement thresholds hierarchy 412. Resource requirement thresholds hierarchy 412 is a method of computing the resource requirement of changing the configuration or placement of a VM from one position in a given hierarchy, such as hierarchy 300 in FIG. 3, to another position in the hierarchy. Resource requirement thresholds hierarchy 412 can take the form of logic, formulae, table, or code for computing the resource requirements for changes involving various levels of a given hierarchy.

Using a combination of inputs 44, 46, 408, and 412, application 402 outputs recommendation 414. Recommendation 414 provides a recommended configuration change, placement change, or both, for a VM that has experienced violation 406, has violation value 408, or both.

With reference to FIG. 4B, this figure depicts line graphs of example methods for computing violation values in accordance with an illustrative embodiment. Graphs 450 and 452 can be generated and/or used by violation value computing component 410 for computing violation value 408 in FIG. 4A.

In an example method of computing violation value, an embodiment executes a benchmark workload on a VM having a given configuration. The embodiment measures one or more parameters of the VM during the performance of the workload. Comparing the measurements with corresponding thresholds, the embodiment determines a proportion of a parameter exceeding a corresponding threshold versus the parameter remaining within the threshold. The embodiment uses the proportion to determine a violation value of the VM's configuration.

For example, as depicted in graph 450 generated using a given VM with a given configuration, and using the processor utilization as an example parameter, an embodiment executes an example benchmark workload comprising ten tasks of varying complexities. The embodiment determines that two out of the ten workloads causes the processor utilization to exceed a threshold set at thirty percent as shown. In one example computation of a violation value for the VM, as depicted in graph 450, the embodiment assesses a violation value of 0.2 because two out of ten tasks caused the parameter to exceed the corresponding threshold.

Now consider that the threshold is not merely a percentage threshold but a combination of a percentage of the processor utilization and an amount of time spent at a certain utilization. Again using the above example benchmark workload, and as depicted in graph 452, an embodiment determines that the total benchmark workload executed for two seconds, but the two tasks that caused the utilization parameter to exceed thirty percent maintained that utilization level for a total of one second. Thus, using graph 452, the embodiment assesses a violation value of 0.5 because the utilization parameter exceeded a set value for one out of two seconds, or fifty percent of the time. Many other ways of calculating a violation value are contemplated within the scope of the illustrative embodiments.

Figure 5:
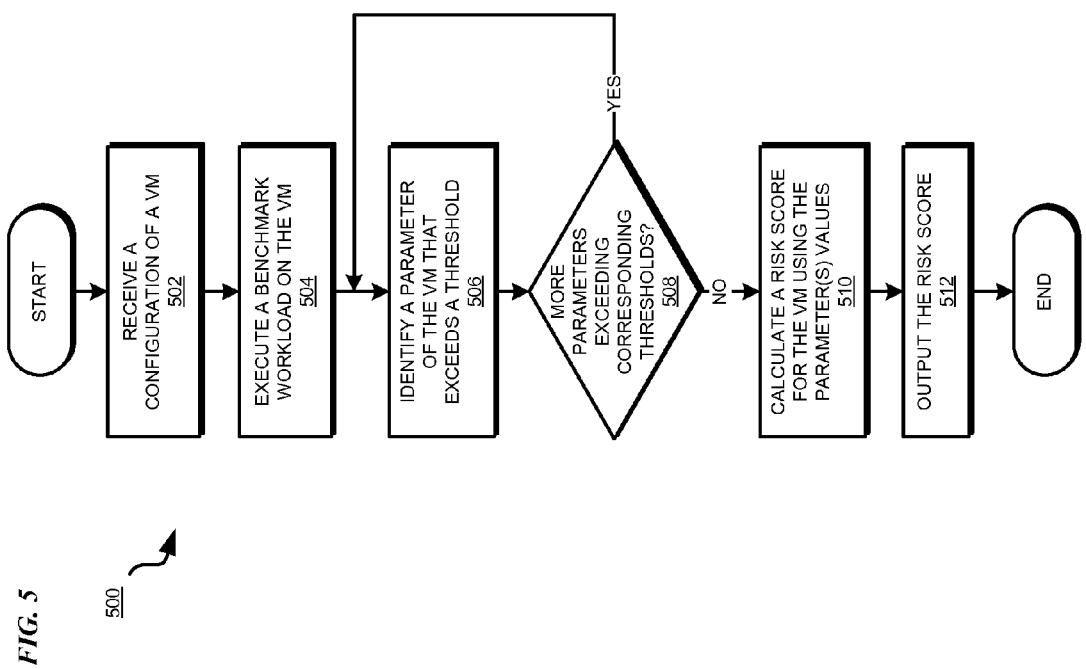
FIG. 5 depicts a flowchart of an example process of calculating a violation value for a VM in accordance with an illustrative embodiment.

With reference to FIG. 5, this figure depicts a flowchart of an example process of calculating a violation value for a VM in accordance with an illustrative embodiment. Process 500 can be implemented in violation value computing component 410 in FIG. 4, as a part of application 402 or as supplying an input to application 402 in FIG. 4.

Process 500 begins by receiving a configuration of a VM (step 502). Process 500 executes a benchmark workload on the VM (step 504). The benchmark workload can be configured in any suitable manner according to a given implementation within the scope of the illustrative embodiments.

Process 500 identifies a parameter of the VM that exceeds a threshold (step 506). Process 500 determines whether more than one parameters of the VM exceed their corresponding benchmarks (step 508).

If more parameters have exceeded their corresponding thresholds ("Yes" path of step 508), process 50 returns to step 506. If all parameters that exceed their corresponding thresholds have been identified ("No" path of step 508), process 500 calculates a violation value of the VM using those parameters' values (step 510). Elsewhere, this disclosure describes at least two ways of calculating the violation value in step 510.

Process 500 outputs the violation value (step 512). Process 500 ends thereafter.

Figure 6:
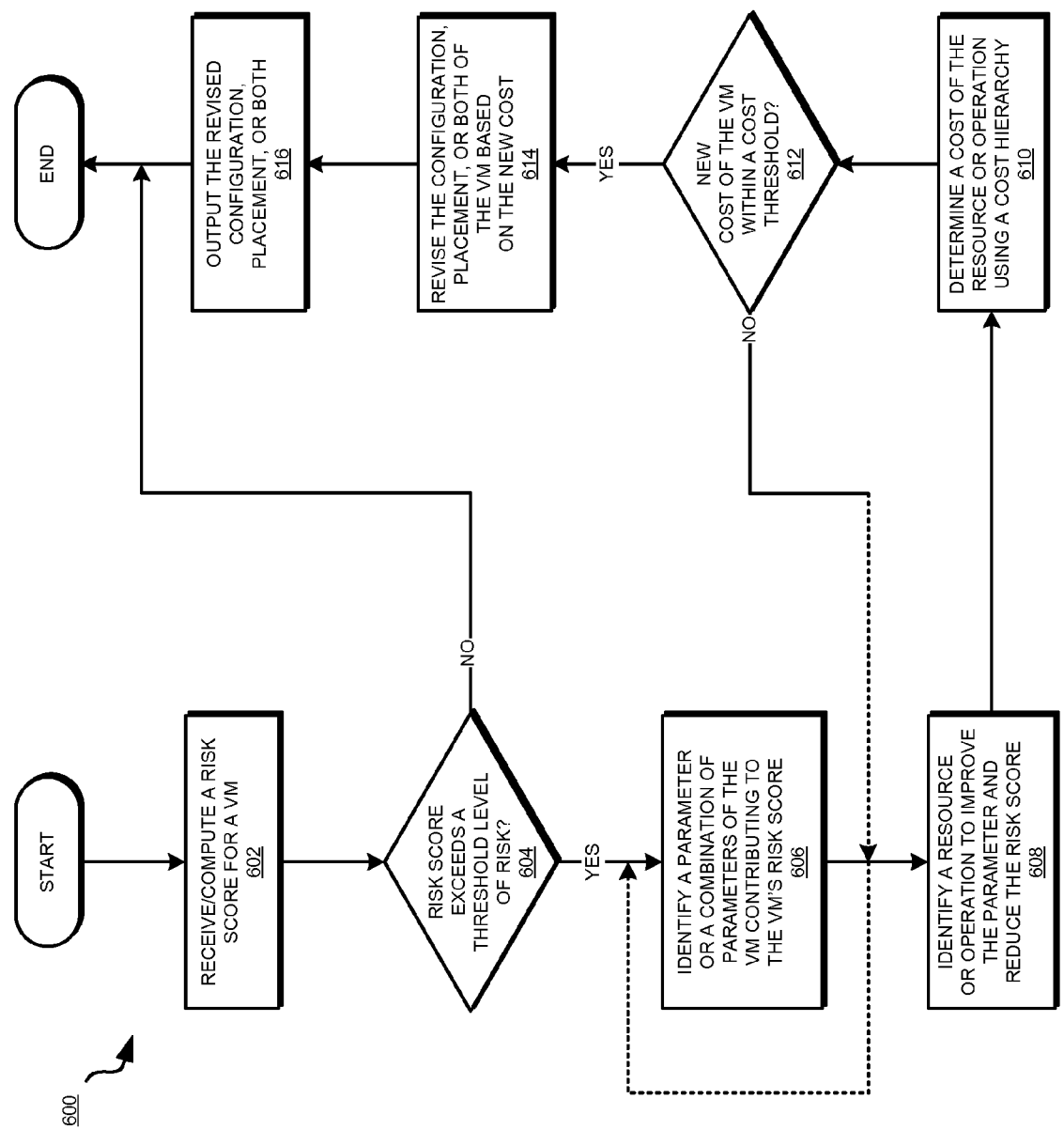
FIG. 6 depicts a flowchart of an example process of hierarchical resource requirement thresholds-based VM configuration for reducing a likelihood of a violation in accordance with an illustrative embodiment.

With reference to FIG. 6, this figure depicts a flowchart of an example process of hierarchical resource requirement thresholds-based VM configuration for reducing a likelihood of a violation in accordance with an illustrative embodiment. Process 600 can be implemented in application 402 in FIG. 4.

Process 600 begins by receiving or computing a violation value for a VM (step 602). Process 600 determines whether the violation value exceeds a threshold level of likelihood of a violation (step 604).

If the violation value does not exceed the threshold level of likelihood of a violation ("No" path of step 604), process 600 ends thereafter.

If the violation value exceeds the threshold level of likelihood of a violation ("Yes" path of step 604), process 600 identifies a parameter, or a combination of parameters, of the VM, which contribute to the VM's violation value (step 606). Process 600 identifies a resource or operation to improve the parameter and reduce the violation value (step 608).

For example, a benchmark workload may measure transaction processing time as one parameter. In a given virtualized data processing environment where the violation value is determined, another parameter may be number of VMs accessing a license database. A VM may encounter a situation where the transaction processing time exceeds a threshold due to a number of VM's accessing the same license database in that environment may be competing for the same license with each other. Consequently, the VM's violation value exceeds the threshold violation value level.

As one solution in step 608, an embodiment identifies an additional license—a resource—that can be allocated to a VM, added to the license pool, or both. Alternatively, an embodiment identifies another cluster that uses a different license database, where the contention for the license is less than in the present cluster. Accordingly, in step 608, the embodiment decides to move the VM to the other cluster—an operation relative to the VM—to reduce the violation value of the VM. Alternatively, another embodiment can both allocate a license—a resource—to the VM, and decide to move the VM to the other cluster—perform an operation relative to the VM—in step 608.

Process 600 determines a resource requirement of the operation using the resource requirement thresholds hierarchy (step 610). Process 600 determines whether the new resource requirement of operating the VM in the revised configuration is within a resource requirement threshold (step 612).

If process 600 determines that the new resource requirement exceeds the resource requirement threshold ("No" path of step 612), process 600 can return to step 608 and try to find a different resource or operation to improve the parameter. Alternatively, such as when no alternative resources or operations are helpful in improving the parameter, process 600 can return to step 606 and select a different parameter or combination of parameters to manipulate for reducing the violation value.

If the new resource requirement is within the resource requirement threshold ("Yes" path of step 612), process 600 revises the configuration, with or without revising the placement, of the VM based on the selected resources or operations corresponding to the new cost (step 614). Process 600 outputs the revised configuration, placement, or both, for the VM, such as in the manner of recommendation 414 in FIG. 4 (step 616). Process 600 ends thereafter.

Figure 7:
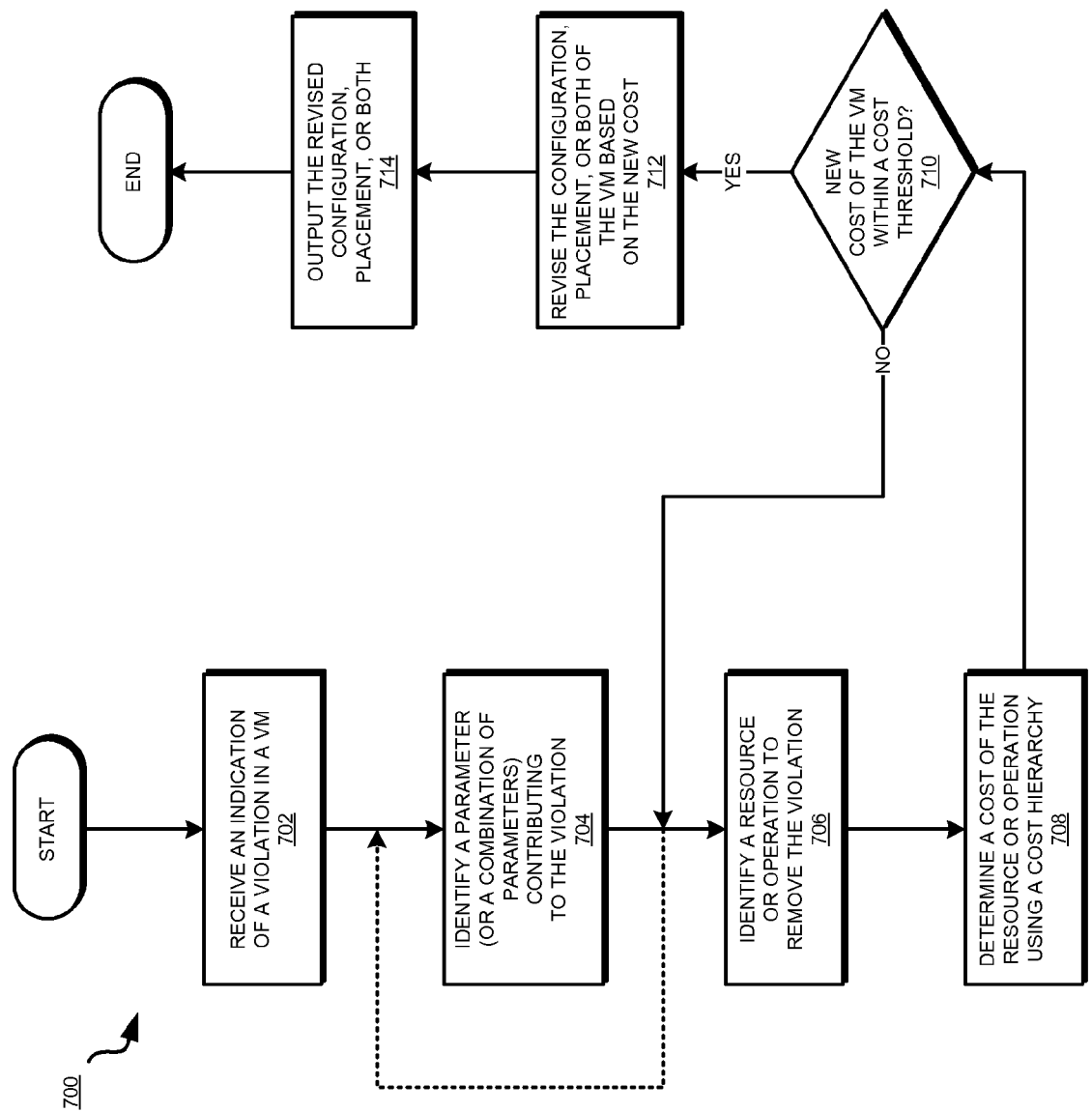
FIG. 7 depicts a flowchart of an example process of hierarchical resource requirement thresholds-based VM configuration for removing a violation in accordance with an illustrative embodiment.

With reference to FIG. 7, this figure depicts a flowchart of an example process of hierarchical resource requirement thresholds-based VM configuration for removing a violation in accordance with an illustrative embodiment. Process 700 can be implemented in application 402 in FIG. 4.

Process 700 begins by receiving an indication of a violation in a VM of a given configuration (step 702). Process 700 identifies a parameter, or a combination of parameters, of the VM, which contribute to the violation (step 704). Process 700 identifies a resource or operation to improve the parameter and remove the violation (step 706).

For example, suppose that one parameter involved in the violation were transaction processing time for a transaction and another parameter were a number of VMs accessing a license database. A VM may violate a policy when the transaction processing time exceeds a threshold because a number of VM's accessing the same license database in that environment may be competing for the same license with each other.

As one solution in step 706, an embodiment identifies an additional license resource that can be allocated to a VM or added to the license database. Alternatively, an embodiment identifies another cluster that uses a different license database, where the contention for the license is less than in the present cluster. Accordingly, in step 706, the embodiment decides to perform a migration operation on the VM to move the other cluster. As in process 600 in FIG. 6, an embodiment can both manipulate a resource and perform an operation relative to the VM in step 706.

Process 700 determines a resource requirement of the operation using the resource requirement thresholds hierarchy (step 708). Process 700 determines whether the new resource requirement of operating the VM in the revised configuration is within a resource requirement threshold (step 710).

If process 700 determines that the new resource requirement exceeds the resource requirement threshold ("No" path of step 710), process 700 can return to step 706 and try to find a different resource or operation to improve the parameter. Alternatively, such as when no alternative resources or operations are helpful in improving the parameter, process 700 can return to step 704 and select a different parameter or combination of parameters to manipulate for removing the violation.

If the new resource requirement is within the resource requirement threshold ("Yes" path of step 710), process 700 revises the configuration, with or without revising the placement, of the VM based on the selected resources or operations corresponding to the new cost (step 712). Process 700 outputs the revised configuration, placement, or both, for the VM, such as in the manner of recommendation 414 in FIG. 4 (step 714). Process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for hierarchical thresholds-based VM configuration. Using an embodiment of the invention, an actual violation can be removed, or a likelihood of a violation in the VM can be mitigated, by determining the hierarchical resource requirement thresholds of various solutions and selecting a suitable solution based on those thresholds. An embodiment can also be used for determining an initial configuration of a VM, such that the initial configuration satisfies a threshold violation value level when deployed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and mainframe programming languages such as REXX, Assembly, and Cobol. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for hierarchical thresholds-based configuring of a virtual machine (VM), the computer usable code comprising:
    computer usable code to cause a processor to identify, responsive to a performance parameter of the VM exceeding a threshold, an operation to be performed relative to the VM;
    computer usable code to cause the processor to determine, using a resource requirement thresholds hierarchy, a resource requirement of performing the operation, wherein the resource requirement thresholds hierarchy is usable for computing the resource requirement of the operation when the operation is performed at a specified level in a hierarchy within a virtualized data processing environment (environment) where the VM is executing, the hierarchy within the environment defines a logical virtualization infrastructure within a data center;
    computer usable code to cause the processor to determine, using a violation value thresholds hierarchy, a violation value resulting from performing the operation, wherein the violation value thresholds hierarchy is usable for computing the violation value resulting from the operation when the operation is performed at the specified level in the hierarchy within the environment where the VM is executing; and
    computer usable code to cause the processor to revise, responsive to the resource requirement not exceeding a resource requirement threshold and the violation value not exceeding a violation value threshold, a first configuration of the VM to a second configuration of the VM, wherein the second configuration includes a result of performing the operation relative to the VM at the specified level in the hierarchy.

2. The computer usable program product of claim 1, further comprising:
    computer usable code to cause the processor to receive a description of the hierarchy within the environment, the hierarchy including a plurality of levels of data processing systems in parent-child relationships;
    computer usable code to cause the processor to create the resource requirement thresholds hierarchy, such that the resource requirement thresholds hierarchy includes a plurality of resource requirement threshold levels, wherein a resource requirement threshold level in the plurality of resource requirement threshold levels corresponds to a level of data processing system in the plurality of levels of data processing systems in the hierarchy.

3. The computer usable program product of claim 2, wherein the resource requirement threshold level includes a static resource requirement of performing the operation at the level in the hierarchy, and a variable resource requirement of performing the operation at the level in the hierarchy.

4. The computer usable program product of claim 1, wherein the performance parameter exceeding the threshold corresponds to a first violation value of the VM configured according to the first configuration.

5. The computer usable program product of claim 1, wherein the computer usable code is stored in a computer readable storage device in a data processing system, and wherein the computer usable code is transferred over a network from a remote data processing system.

6. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

7. A data processing system for hierarchical thresholds-based configuring of a virtual machine (VM), the data processing system comprising:
    a storage device, wherein the storage device stores computer usable program code; and
    a processor, wherein the processor executes the computer usable program code, and wherein the computer usable program code comprises:
    computer usable code for identifying, responsive to a performance parameter of the VM exceeding a threshold, an operation to be performed relative to the VM;
    computer usable code for determining, using a resource requirement thresholds hierarchy, a resource requirement of performing the operation, wherein the resource requirement thresholds hierarchy is usable for computing the resource requirement of the operation when the operation is performed at a specified level in a hierarchy within a environment where the VM is executing, the hierarchy within the environment defines a logical virtualization infrastructure within a data center;
    computer usable code for determining, using a violation value thresholds hierarchy, a violation value resulting from performing the operation, wherein the violation value thresholds hierarchy is usable for computing the violation value resulting from the operation when the operation is performed at the specified level in the hierarchy within the environment where the VM is executing; and
    computer usable code for revising, responsive to the resource requirement not exceeding a resource requirement threshold and the violation value not exceeding a violation value threshold, a first configuration of the VM to a second configuration of the VM, wherein the second configuration includes a result of performing the operation relative to the VM at the specified level in the hierarchy.

8. The computer usable program product of claim 1, further comprising:
  computer usable code to cause the processor to execute a benchmark workload on the VM, wherein the performance parameter exceeding the threshold responsive to the executing the benchmark workload is indicative of a likelihood of a violation in the VM; and
  computer usable code to cause the processor to compute a first violation value for the VM based on the performance parameter exceeding the threshold.

9. The computer usable program product of claim 1, further comprising:
  computer usable code to cause the processor to receive a description of the hierarchy within the environment, the hierarchy including a plurality of levels of data processing systems in parent-child relationships; and
  computer usable code to cause the processor to create the violation value thresholds hierarchy, such that the violation value thresholds hierarchy includes a plurality of violation value levels, wherein a violation value level in the plurality of violation value levels corresponds to a level of data processing system in the plurality of levels of data processing systems in the hierarchy.

10. The computer usable program product of claim 1, further comprising:
  computer usable code to cause the processor to identify, responsive to the resource requirement exceeding a resource requirement threshold, a second performance parameter of the VM exceeding a second threshold;
  computer usable code to cause the processor to identify a second operation to be performed relative to the VM to improve the second performance parameter; and
  computer usable code to cause the processor to replace, in the determining and the revising, the performance parameter with the second performance parameter and the operation with the second operation.

11. The computer usable program product of claim 1, further comprising:
  computer usable code to cause the processor to identify, responsive to the violation value exceeding a violation value threshold, a second performance parameter of the VM exceeding a second threshold;
  computer usable code to cause the processor to identify a second operation to be performed relative to the VM to improve the second performance parameter; and
  computer usable code to cause the processor to replace, in the determining and the revising, the performance parameter with the second performance parameter and the operation with the second operation.

12. The computer usable program product of claim 1, wherein the performance parameter exceeding the threshold corresponds to a violation of a policy in the VM configured according to the first configuration.

13. The computer usable program product of claim 1, wherein the computer usable code to cause the processor to revise enables computer usable code to cause the processor to unilaterally provision computing capabilities, and wherein the policy is a service level agreement (SLA).

14. The computer usable program product of claim 1, wherein the operation includes allocating a resource to the VM, and wherein software is provided as a service in a cloud computing environment.

15. The computer usable program product of claim 1, where the performance parameter is a combination of a plurality of parameters.

16. The computer usable program product of claim 1, wherein a first violation value of a first level in the violation value thresholds hierarchy relates to a second violation value of a second level in the violation value thresholds hierarchy by a mathematical function.

17. The computer usable program product of claim 1, wherein the violation value comprises a probability of a violation occurring in the specified level in the hierarchy within the environment by performing the operation in the specified level in the hierarchy within the environment.

18. The computer usable program product of claim 1, wherein a first resource requirement value of a first level in the resource requirement thresholds hierarchy relates to a second resource requirement value of a second level in the resource requirement thresholds hierarchy by a mathematical function.

* * * * *